(12) United States Patent
Wang et al.

(10) Patent No.: US 9,703,782 B2
(45) Date of Patent: Jul. 11, 2017

(54) ASSOCIATING MEDIA WITH METADATA OF NEAR-DUPLICATES

(75) Inventors: Xin-Jing Wang, Beijing (CN); Lei Zhang, Beijing (CN); Ming Liu, Palo Alto, WA (US); Yi Li, Issaquah, WA (US); Wei-Ying Ma, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 353 days.

(21) Appl. No.: 12/790,772

(22) Filed: May 28, 2010

(65) Prior Publication Data

US 2011/0295775 A1    Dec. 1, 2011

(51) Int. Cl.
*G06F 17/30* (2006.01)

(52) U.S. Cl.
CPC .. *G06F 17/30038* (2013.01); *G06F 17/30265* (2013.01)

(58) Field of Classification Search
CPC ........... G06F 17/30705; G06F 17/2211; G06F 17/30088; G06F 17/30265
USPC ....................................................... 707/708
See application file for complete search history.

(56) References Cited

U.S. PATENT DOCUMENTS

| | | | |
|---|---|---|---|
| 5,852,823 A | 12/1998 | De Bonet | |
| 5,893,095 A | 4/1999 | Jain et al. | |
| 6,005,973 A | 12/1999 | Seybold et al. | |
| 6,480,841 B1 | 11/2002 | Higashio et al. | |
| 6,523,026 B1 | 2/2003 | Gillis | |
| 6,523,062 B1 | 2/2003 | Bridgman et al. | |
| 6,804,684 B2 | 10/2004 | Stubler et al. | |
| 7,010,751 B2 | 3/2006 | Shneiderman | |
| 7,099,860 B1 | 8/2006 | Liu et al. | |
| 7,136,876 B1 | 11/2006 | Adar et al. | |
| 7,529,411 B2 | 5/2009 | Haupt et al. | |
| 7,624,337 B2 | 11/2009 | Sull et al. | |
| 7,739,304 B2 | 6/2010 | Naaman et al. | |
| 7,961,986 B1 | 6/2011 | Jing et al. | |
| 7,971,150 B2 | 6/2011 | Raskutti et al. | |

(Continued)

FOREIGN PATENT DOCUMENTS

| | | |
|---|---|---|
| JP | 1196176 | 4/1999 |
| JP | 2003186889 | 7/2003 |

(Continued)

OTHER PUBLICATIONS

Barnard, et al., "Matching Words and Pictures", retrieved on Apr. 16, 2010 at <<http://www.cs.princeton.edu/~blei/papers/Barnard-DuyguluFreitasForsythBleiJordan2003.pdf>>, JMLR.org, Journal of Machine Learning Research, vol. 3, Mar. 2003, pp. 1107-1135.

(Continued)

*Primary Examiner* — Dinku Gebresenbet
(74) *Attorney, Agent, or Firm* — Lee & Hayes, PLLC

(57) ABSTRACT

Techniques for identifying near-duplicates of a media object and associating metadata of the near-duplicates with the media object are described herein. One or more devices implementing the techniques are configured to identify the near duplicates based at least on similarity attributes included in the media object. Metadata is then extracted from the near-duplicates and is associated with the media object as descriptors of the media object to enable discovery of the media object based on the descriptors.

19 Claims, 9 Drawing Sheets

(56) References Cited

U.S. PATENT DOCUMENTS

| | | | |
|---|---|---|---|
| 8,112,702 | B2 | 2/2012 | Badoiu et al. |
| 8,185,526 | B2 | 5/2012 | Wen et al. |
| 8,234,277 | B2 | 7/2012 | Thong et al. |
| 8,340,498 | B1 | 12/2012 | Gill et al. |
| 8,391,618 | B1 | 3/2013 | Chuang et al. |
| 8,429,173 | B1 | 4/2013 | Rosenberg et al. |
| 8,442,940 | B1 | 5/2013 | Faletti et al. |
| 8,478,052 | B1 | 7/2013 | Yee et al. |
| 8,510,308 | B1 | 8/2013 | Pasca et al. |
| 2002/0038299 | A1 | 3/2002 | Zernik et al. |
| 2002/0138478 | A1 | 9/2002 | Schwartz et al. |
| 2003/0018631 | A1 | 1/2003 | Lipson et al. |
| 2003/0195883 | A1 | 10/2003 | Mojsilovic et al. |
| 2004/0133418 | A1 | 7/2004 | Turcato et al. |
| 2004/0213553 | A1 | 10/2004 | Nagahashi |
| 2004/0225686 | A1 | 11/2004 | Li et al. |
| 2005/0114325 | A1 | 5/2005 | Liu et al. |
| 2005/0182777 | A1* | 8/2005 | Block et al. ............ 707/100 |
| 2005/0228657 | A1 | 10/2005 | Chou et al. |
| 2005/0278379 | A1 | 12/2005 | Nakazawa |
| 2006/0195321 | A1 | 8/2006 | Deligne et al. |
| 2006/0242013 | A1 | 10/2006 | Agarwal et al. |
| 2006/0242147 | A1 | 10/2006 | Gehrking et al. |
| 2006/0264209 | A1 | 11/2006 | Atkinson et al. |
| 2007/0005571 | A1 | 1/2007 | Brewer et al. |
| 2007/0061146 | A1 | 3/2007 | Jaramillo et al. |
| 2007/0078846 | A1 | 4/2007 | Gulli et al. |
| 2007/0106685 | A1 | 5/2007 | Houh et al. |
| 2007/0112844 | A1* | 5/2007 | Tribble et al. ............ 707/102 |
| 2007/0156770 | A1* | 7/2007 | Espelien ............ 707/200 |
| 2007/0237426 | A1 | 10/2007 | Xie et al. |
| 2007/0240060 | A1 | 10/2007 | Berenbach et al. |
| 2007/0266001 | A1 | 11/2007 | Williams et al. |
| 2007/0271226 | A1* | 11/2007 | Zhang ............ G06F 17/30265 707/999.003 |
| 2007/0288453 | A1 | 12/2007 | Podilchuk |
| 2008/0046240 | A1* | 2/2008 | Gorodyansky et al. ...... 704/235 |
| 2008/0235724 | A1 | 9/2008 | Sassenscheidt et al. |
| 2008/0281915 | A1* | 11/2008 | Elad et al. ............ 709/204 |
| 2008/0313541 | A1 | 12/2008 | Shafton et al. |
| 2009/0012869 | A1 | 1/2009 | Henkin et al. |
| 2009/0148071 | A1* | 6/2009 | Ohwa ............ G11B 27/105 382/306 |
| 2009/0171929 | A1 | 7/2009 | Jing et al. |
| 2009/0172030 | A1 | 7/2009 | Schiff et al. |
| 2009/0187825 | A1 | 7/2009 | Sandquist et al. |
| 2009/0196510 | A1 | 8/2009 | Gokturk et al. |
| 2009/0208097 | A1* | 8/2009 | Husseini et al. ............ 382/162 |
| 2009/0249185 | A1 | 10/2009 | Datar et al. |
| 2009/0300475 | A1 | 12/2009 | Fink et al. |
| 2009/0313239 | A1 | 12/2009 | Wen et al. |
| 2009/0319883 | A1 | 12/2009 | Mei et al. |
| 2010/0057694 | A1* | 3/2010 | Kunjithapatham et al. ...... 707/3 |
| 2010/0067745 | A1* | 3/2010 | Kovtun et al. ............ 382/106 |
| 2010/0074528 | A1 | 3/2010 | Hu et al. |
| 2010/0076923 | A1 | 3/2010 | Hua et al. |
| 2010/0076968 | A1 | 3/2010 | Boyns et al. |
| 2010/0145803 | A1 | 6/2010 | Kobani |
| 2010/0169178 | A1 | 7/2010 | Wang et al. |
| 2010/0177956 | A1 | 7/2010 | Cooper et al. |
| 2010/0205202 | A1 | 8/2010 | Yang et al. |
| 2010/0260426 | A1 | 10/2010 | Huang et al. |
| 2010/0293174 | A1 | 11/2010 | Bennett et al. |
| 2010/0303342 | A1 | 12/2010 | Berg et al. |
| 2010/0325015 | A1 | 12/2010 | Westphal |
| 2011/0085739 | A1 | 4/2011 | Zhang et al. |
| 2011/0106782 | A1 | 5/2011 | Ke et al. |
| 2011/0122255 | A1* | 5/2011 | Haritaoglu ............ 348/180 |
| 2011/0173141 | A1 | 7/2011 | Campbell et al. |
| 2012/0045134 | A1 | 2/2012 | Perronnin et al. |
| 2013/0046761 | A1 | 2/2013 | Soderberg et al. |
| 2013/0282712 | A1 | 10/2013 | Brandt |
| 2014/0032529 | A1 | 1/2014 | Chang |
| 2015/0082173 | A1 | 3/2015 | El-Saban et al. |

FOREIGN PATENT DOCUMENTS

| | | |
|---|---|---|
| JP | 2004234228 | 8/2004 |
| JP | 2005011079 | 1/2005 |
| JP | 2005352782 | 12/2005 |
| KR | 20040054901 | 6/2004 |
| RU | 2193797 | 11/2002 |

OTHER PUBLICATIONS

Carneiro, et al., "Supervised Learning of Semantic Classes for Image Annotation and Retrieval", retrieved on Apr. 16, 2010 at <<http://citeseerx.ist.psu.edu/viewdoc/download?doi=10.1.1.88. 3490&rep=rep1&type=pdf>>, IEEE Computer Society, Transactions on Pattern Analysis and Machine Intelligence, vol. 29, No. 3, Mar. 2007, pp. 394-410.

Deng, et al., "ImageNet: A Large-Scale Hierarchical Image Database", retrieved on Apr. 16, 2010 at <<http://wordnet.cs.princeton. edu/papers/imagenet_cvpr09.pdf>>, Proceedings of the IEEE Conference on Computer Vision and Pattern Recognition (CVPR), 2009, pp. 1-8.

Fellbaum (ed.), "WordNet: An Electronic Lexical Database", retrieved on Apr. 16, 2010 at <<http://www.dsoergel.com/cv/C19. pdf>>, MIT Press, Cambridge, MA, May 1998, 7 pages.

Foo, et al., "Detection of Near-duplicate Images for Web Search", retrieved on Apr. 16, 2010 at <<http://www.cs.rmit.edu.au/~jufoo/ pdfs/CIVR07_Foo.pdf>>, ACM, Proceedings of the 6th International Conference on Image and Video Retrieval (CIVR), Amsterdam, The Netherlands, Feb. 2007, pp. 557-564.

Gelasca, et al., "CORTINA: Searching a 10 Million + Images Database", retrieved on Apr. 16, 2010 at <<http://vision.ece.ucsb. edu/publications/elisa_VLDB_2007.pdf>>, VLDB Endowment, Proceedings of Conference on Very Large Data Bases (VLDB), Vienna, Austria, vol. 7, Sep. 2007, pp. 2-5.

Griffin, et al., "Caltech-256 Object Category Dataset", retrieved on Apr. 16, 2010 at <<http://authors.library.caltech.edu/7694/1/CNS-TR-2007-001.pdf>>, Caltech Technical Report 7694, 2007, pp. 1-20.

Hays, et al., "Scene Completion Using Millions of Photographs", retrieved on Apr. 16, 2010 at <<http://delivery.acm.org/10.1145/ 1280000/1276382/a4-hays.pdf?key1=1276382&key2=4013141721 &coll=GUIDE&dl=GUIDE&CFID=84511483 &CFTOKEN=74352152>>, ACM, Transactions on Graphics, vol. 26, No. 3, Article 4, Jul. 2007, pp. 1-8.

Jaspers et al., "CANDELA—Storage, Analysis and Retrieval of Video Content in Distributed Systems", retrived at <<http://vca.ele. tue.nl/publications/data/jaspers2005a.pdf>>, on Apr. 17, 2010, 14 pages.

Ke, et al., "PCA-SIFT: A More Distinctive Representation for Local Image Descriptors", retrieved on Apr. 16, 2010 at <<http://www. cs.cmu.edu/~rahuls/pub/cvpr2004-keypoint-rahuls.pdf>>, IEEE Computer Society, Conference on Computer Vision and Pattern Recognition (CVPR), vol. 2, Jun. 2004, pp. 1-8.

Li, et al., "Image Annotation by Large-Scale Content-based Image Retrieval", retrieved on Apr. 16, 2010 at <<http://doi.acm.org/10. 1145/1180639.1180764>>, ACM, Proceedings of the 14th Annual International Conference on Multimedia, Santa Barbara, CA, Oct. 2006, pp. 607-610.

Li, et al., "Searching One Billion Web Images by Content: Challenges and Opportunities", retrieved on Apr. 16, 2010 at <<http:// research.microsoft.com/en-us/um/people/leizhang/paper/mcam07-li.pdf>>, Springer-Verlag Berlin, Proceedings of International Workshop on Multimedia Content Analysis and Mining (MCAM), Weihai, China, Jul. 2007, pp. 33-36.

Lin et al., "Video Collaborative Annotation Forum: Establishing Ground-Truth Labels on Large Multimedia Datasets", IBM T.J. Watson research Center, 2003, pp. 1-19.

Moxley, et al., "Automatic Video Annotation through Search and Mining", retrieved on Apr. 16, 2010 at <<http://ieeexplore.ieee.org/ stamp/stamp.jsp?tp=&arnumber=4607527>>, IEEE Conference on Multimedia and Expo (ICME), Hannover, Germany, Jun. 2008, pp. 685-688.

(56) References Cited

OTHER PUBLICATIONS

"ODP—The Open Directory Project", retrieved on Apr. 16, 2010 at <<http://dmoz.org/>>, 2010, pp. 1.

Torralba, et al., "80 million tiny images: a large dataset for non-parametric object and scene recognition", retrieved on Apr. 16, 2010 at <<http://people.csail.mit.edu/torralba/publications/80millionImages.pdf>>, IEEE Computer Society, Transactions on Pattern Analysis and Machine Intelligence, vol. 30, No. 11, Nov. 2008, pp. 1958-1970.

Tseng et al., "Video Summarization and Personalization for Pervasive Mobile Devices", IBM T.J. Watson Research Center, 2002, pp. 1-12.

VTT,"MobiCon—Integrated Capture, Annotation and Sharing of Video Clips with Mobile Phones", retrvied at <<http://www.vtt.fi/files/services/ipr/mobicon_integrated_capture.pdf>> on Apr. 17, 2010, 2 pages.

Wang, et al., "Advertising Based on Users' Photos", retrieved on Apr. 16, 2010 at <<http://ieeexplore.ieee.org/stamp/stamp.jsp?tp=&arnumber=5202834>>, IEEE International Conference on Multimedia and Expo (ICME), New York, NY, 2009, pp. 1640-1643.

Wang, et al., "AnnoSearch: Image Auto-Annotation by Search", retrieved on Apr. 16, 2010 at <<http://research.microsoft.com/en-us/um/people/leizhang/paper/cvpr06_annosearch.pdf>> IEEE Computer Society, Proceedings of Conference on Computer Vision and Pattern Recognition (CVPR), vol. 2, 2006, pp. 1483-1490.

Wang, et al., "Content-Based Image Annotation Refinement", retrieved on Apr. 16, 2010 at <<http://research.microsoft.com/en-us/um/people/leizhang/paper/cvpr07-changhu.pdf>>, IEEE Conference on Computer Vision and Pattern Recognition (CVPR), Jun. 2007, pp. 1-8.

Wang, et al., "Large-Scale Duplicate Detection for Web Image Search", retrieved on Apr. 16, 2010 at http://www.cecs.uci.edu/~papers/icme06/pdfs/0000353.pdf>>, IEEE Conference on Multimedia and Expo (ICME), Toronto, Canada, Jul. 2006, pp. 353-356.

Yamamoto et al., "iVAS: Web-based Video Annotation System and its Applications", retrived at <<http://iswc2004.semanticweb.org/demos/29/paper.pdf>> on Apr. 17, 2010, pp. 1-4.

Yeh, et al., "Searching the Web with Mobile Images for Location Recognition", retrieved on Apr. 16, 2010 at <<http://groups.csail.mit.edu/vision/vip/papers/yeh_cvpr04.pdf>>, IEEE Computer Society, Conference on Computer Vision and Pattern Recognition (CVPR), vol. 2, Jul. 2004, pp. 1-6.

Zeng, et al., "Learning to Cluster Web Search Results", retrieved on Apr. 16, 2010 at <<http://net.pku.edu.cn/~wbia/2004/public_html/papers/learning-to-cluster-web.pdf>>, ACM, Proceedings of the 27th International SIGIR Conference on Research and Development in Information Retrieval, 2004, Sheffield, UK, Jul. 2004, pp. 210-217.

Zhang, et al., "EnjoyPhoto—A Vertical Image Search Engine for Enjoying High-Quality Photos", retrieved on Apr. 16, 2010 at <<http://research.microsoft.com/en-us/um/people/leizhang/paper/acmmm06-enjoyphoto.pdf>>, ACM, Proceedings of the 14th Annual International Conference on Multimedia (MM), Santa Barbara, California, Oct. 2006, pp. 367-376.

Office Action for U.S. Appl. No. 12/563,955, mailed on Oct. 13, 2011, Xin-Jing Wang, "Interest Learning from an Image Collection for Advertising", 21 pgs.

Bing.com, Maps, Retrieved on Dec. 28, 2009 at <<http://cn.bing.com/ditu/>>, 2 pages.

Cai, et al., "Hierarchical Clustering of WWW Image Search Results Using Visual, Textual and Link Information", retrieved on May 26, 2010 at <<http://citeseerx.ist.psu.edu/viewdoc/download?doi=10.1.1.72.455&rep=rep1&type=pdf>>, ACM, Proceedings of International Conference on Multimedia (MM), New York, NY, Oct. 2004, pp. 952-959.

Chang et al., "LIBSVM: a Library for Support Vector Machines", retrieved on Apr. 12, 2010 at <<http:// http://www.csie.ntu.edu.tw/~cjlin/papers/libsvm.pdf>>, National Taiwan University Technical Report, Computer Science and Information Engineering, 2001-2004, pp. 1-30.(software available at http://www.csie.ntu.edu.tw/~cjlin/libsvm).

Classification and Retrieval of Images—Published Date: Sep. 17, 2010, http://claret.wikidot.com/, 3 pages.

Fergus et al., "A Visual Category Filter for Google Images," Computer Vision—\ ECCV, 2004, Lecture Notes in Computer Science, 2004, vol. 3021/2004, 14 pages.

Flickr. retrieved on Feb. 4, 2010 at <<http://www.flickr.com >>, 1 page.

"Google Sets", retrieved on Dec. 15, 2008 at <<http://labs.google.com/sets>>, Google, 1 page.

Google, retrieved on Feb. 16, 2011 at <<www.google.com>, 1 page.

Hua, et al. "Internet Multimedia Search and Mining"—Published date: Jan. 27, 2010 http://research.microsoft.com/en-us/um/people/xshua/imsm/ebook/pdf/16.pdf, 30 pages.

Jing, et al., "VisualRank: Applying PageRank to Large-Scale Image Search", retrieved on May 26, 2010 at <<http://www.cc.gatech.edu/home/yjing/pami_camera_ready.pdf>>, IEEE Computer Society, Transactions on Pattern Analysis and Machine Intelligence, vol. 30, No. 11, Nov. 2008, pp. 1-14.

Kennedy, et al., "Generating Diverse and Representative Image Search Results for Landmarks", retrieved on May 26, 2010 at <<http://www.google.co.in/url?sa=t&source=web&ct=res&cd=6&ved=0CB8QFjAF&url=http%3A%2F%2Fciteseerx.ist.psu.edu%2Fviewdoc%2Fdownload%3Fdoi%3D10.1.1.119.1522%26rep%3Drep1%26type%3Dpdf&rct=j&q=generating+web+image+cluster&ei=A0irS6LUMtO6jAeJofjWDw&usg=AFQjCNEFwCBRBWDdZIkpXuFUcIS1-n601g>>, ACM, Proceedings of International Conference on World Wide Web (WWW), Beijing, CN, Apr. 2008, pp. 297-306.

Li et al., "Automatic Linguistic Indexing of Pictures by a Statistical Modeling Approach" IEEE Transactions on Pattern Analysis and Machine Intelligence, 25(9):1075-1088, 2003.

Lowe, "Distinctive Image Features from Scale-Invariant Keypoints", retrieved on Jul. 30, 2010 at <<http://citeseerx.ist.psu.edu/viewdoc/download?doi=10.1.1.157.3843&rep=rep1&type=pdf>>, Kluwer Academic Publishers, Hingham, MA, vol. 60, No. 2, International Journal of Computer Vision, 2004, pp. 91-110.

Miller, "Wordnet: an on-line lexical database" International Journal of Lexicography, pp. 39-41, 1990.

Needle Seek, retrieved on Feb. 16, 2011 at <<http://needleseek.msra.cn>>, 1 page.

Noah, et al. "Binding Semantic to a Sketch Based Query Specification Tool"—Published Date: Apr. 2009 http://www.ccis2k.org/iajit/PDF/vol. 6,No. 2/2BSSBOST116.pdf, 8 pages.

Nowak, et al., "Sampling strategies for bag-of-features image classification," (c) Springer-Verlag Berlin Heidelberg 2006, ECCV 2006, retrieved at <<http://lear.inrialpes.fr/people/nowak/dwl/eccv06.pdf>>, 14 pages.

Picasa 3, retrived at http://picasa.google.com/ on Aug. 4, 2009, 1 page.

The Russian Office Action mailed Mar. 25, 2011 for Russian Patent Application No. 2008145584, a counterpart foreign application of U.S. Appl. No. 11/419,368.

Strong, et al., "Organizing and Browsing Image Search Results based on Conceptual and Visual Similarities" Retrieved Date: Jan. 5, 2011, http://www.cs.mun.ca/~hoeber/download/2010_isvc_vibe_concept.pdf, 10 pages.

Wnuk, et al. "Filtering Internet Image Search Results Towards Keyword Based Category Recognition" Retrieved Date: Jan. 5, 2011 http://vision.ucla.edu/papers/wnukS08.pdf, 8 pages.

Yang, et al., "A Comparative Study on Feature Selection in Text Categorization", Proceedings of the Fourteenth International Conference on Machine Learning, 1997, pp. 412-420 (9 pages).

Batra, et al., "Cutout-Search: Putting a Name to the Picture", retrieved on Aug. 2, 2010 at <<http://chenlab.ece.cornell/edu/people/adarsh/publications/cvpr_iv_2009.pdf>>, IEEE Computer Society, Proceedings of Workshop on Computer Vision and Pattern Recognition (CVPR), Miami, Florida, Jun. 2009, pp. 23-30.

(56) References Cited

OTHER PUBLICATIONS

"Become an Online Image Detective with TinEye (groovyReview)", retrieved on Aug. 3, 2010 at <<http://www.groovypost.com/howto/groovyreview/become-online-image-detective-tineye-review/>>, groovyPost.com, Jan. 18 2010, pp. 1-11.
Deschacht, et al., "Text Analysis for Automatic Image Annotation", retrieved on Aug. 2, 2010 at <<http://class.inrialpes.fr/pub/106-deschacht-acl07.pdf>>, Meeting of the Association for Computational Linguistics, Prague, Jun. 2007, pp. 1-8.
Jones, "Windows Live Photo and Video Blog", retrieved on Aug. 3, 2010 at <<http://blogs.msdn.com/b/pix/archive/2008/09/17/next-version-of-windows-live.aspx>>, Sep. 17, 2008, pp. 1.
Monaghan, et al., "Automating Photo Annotation using Services and Ontologies", retrieved on Aug. 2, 2010 at <<http://ieeexplore.ieee.org/stamp/stamp.jsp?arnumber=01630615>>, IEEE Computer Society, Proceedings of International Conference on Mobile Data Management (MDM), 2006, pp. 1-4.
Osman, et al., "Semantic Annotation and Retrieval of Image Collections", retrieved on Aug. 2, 2010 at <<http://www.scs-europe.net/conf/ecms2007/ecms2007-cd/ecms2007/ecms2007%20pdf/vv_0167.pdf>>, Proceedings European Conference on Modelling and Simulation (ECMS), 2007, pp. 1-6.
Satoh, et al., "Name-It: Naming and Detecting Faces in News Videos", retrieved on Aug. 2, 2010 at <<http://www.informedia.cs.cmu.edu/documents/nameit_IEEE-MM99.pdf>>, IEEE Computer Society, Multimedia, vol. 6, No. 1, 1999, pp. 22-35.
Trajkova, et al., "Improving Ontology-Based User Profiles." In Proc. of RIAO, pp. 380-389, 2004.
Wang, et al., "ARISTA—Image Search to Annotation on Billions of Web Photos", retrieved on Aug. 2, 2010 at <<http://research.microsoft.com/en-us/people/xjwang/cvpr10_paper301_arista_final.pdf>>, IEEE Computer Society, Proceedings of Conference on Computer Vision and Pattern Recognition (CVPR), San Francisco, California, Jun. 2010, pp. 1-8.
Cheng et al., "Auto-Generation of Topic Hierarchies for Web Images from Users' Perspectives", Proc 12th Intl Conf on Information and Knowledge Management, Nov. 2003, available at http://portal.acm.org/citation.cfm?id=956969, 4 pgs.
Chinese Office Action mailed Jul. 6, 2011 for Chinese patent application No. 200780017842.6, a counterpart foreign application of U.S. Appl. No. 11/419,368.
Office Action for U.S. Appl. No. 11/419,368, mailed on Aug. 5, 2011, Lei Zhang, "Annotation by Search".
Office action for U.S. Appl. No. 13/110,282, mailed on Nov. 9, 2012, Wang et al., "Text to Image Translation", 20 pages.
Office Action for U.S. Appl. No. 12/563,955, mailed on Mar. 15, 2012, Xin-Jing Wang, "Interest Learning from an Image Collection for Advertising", 23 pgs.
Office Action for U.S. Appl. No. 12/790,761, mailed on Mar. 20, 2012, Motaz Ahmed El-Saban, "Real-Time Annotation and Enrichment of Captured Video", 15 pgs.
U.S. Appl. No. 13/110,282; "Text to Image Translation" Wang, et al., filed May 18, 2011, 46 pages.
Chinese Office Action mailed Mar. 20, 2012 for Chinese patent application No. 200780017842.6, a counterpart foreign application of U.S. Appl. No. 11/419,368, 8 pages.
Japanese Office Action mailed May 25, 2012 for Japanese patent application No. 2009-511113, a counterpart foreign application of U.S. Appl. No. 11/419,368, 8 pages.
Chinese Office Action mailed Oct. 17, 2012 for Chinese patent application No. 200780017842.6, a counterpart foreign application of U.S. Appl. No. 11/419,368, 8 pages.
Korean Office Action mailed Jun. 14, 2013 for Korean patent application No. 10-2008-7028292, a counterpart foreign application of U.S. Pat. No. 8,341,112, 7 pages.
Office action for U.S. Appl. No. 13/110,282, mailed on Jul. 30, 2013, Xin-Jing Wang et al, "Text to Image Translation", 18 pages.
Office action for U.S. Appl. No. 12/563,955, mailed on May 6, 2013, Wang et al., "Interest Learning from an Image Collection for Advertising ", 25 pages.

Office action for U.S. Appl. No. 12/790,761, mailed on Jun. 10, 2013, Ei-Saban et al., "Real-Time Annotation and Enrichment of Captured Video", 12 pages.
Office action for U.S. Appl. No. 12/563,955, mailed on Aug. 23, 2013, Wang et al., "Interest Learning from an Image Collection for Advertising", 25 pages.
Final Office Action for U.S. Appl. No. 13/110,282, mailed on May 23, 2014, Wang, et al., "Text to Image Translation", 27 pages.
"Auto-Generation of Topic Hierarchies for Web Images from Users' Perspectives" Available at http://portal.acm.org/citation.cfm?id=956969.
Office action for U.S. Appl. No. 12/790,761, mailed on Feb. 6, 2014, Ei-Saban, et al., "Real-Time Annotation and Enrichment of Captured Video", 7 pages.
Office action for U.S. Appl. No. 13/110,282, mailed on Feb. 20, 2014, Wang, et al., "Text to Image Translation", 27 pages.
Office action for U.S. Appl. No. 12/563,955, mailed on Dec. 17, 2013, Wang, et al., "Interest Learning from an Image Collection for Advertising", 25 pages.
Office action for U.S. Appl. No. 13/110,282 mailed on Nov. 23, 2015, Wang et al, "Text to Image Translation," 16 pages.
Office action for U.S. Appl. No. 14/547,941 mailed on Nov. 3, 2015, El-Saban et al., "Real-Time Annotation and Enrichment of Captured Video," 10 pages.
Office action for U.S. Appl. No. 14/547,941, mailed on Jul. 31, 2015, El-Saban et al., "Real-Time Annotation and Enrichment of Captured Video," 9 pages.
Zhang et al., "A comparative study of TF*IDF, LSI and multi-words for text classification," Expert Systems with Applications, vol. 38, Issue 3, Mar. 2011, pp. 2758-2765.
Indian Office Action mailed Aug. 5, 2016 for Indian patent application No. 5844/CHENP/2008, a counterpart foreign application of U.S. Pat. No. 8,341,112, 8 pages.
Davis, et al., "From Context to Content: Leveraging Context to Infer Media Metadata", MM'04, Oct. 10-16, 2004, New York, NY, USA.
European Office Action mailed Mar. 9, 2016 for European Patent Application 07795180.4, a counterpart foreign application of U.S. Pat. No. 8,341,112, 7 pages.
Office action for U.S. Appl. No. 14/547,941, mailed on Apr. 11, 2016, El-Saban et al., "Real-Time Annotation and Enrichment of Captured Video", 10 pages.
Sarvas, et al., "Metadata Creation System for Mobile Images", MobiSys'04, Jun. 6-9, 2004, Boston, MA, USA.
Ben-Haim, et al., "Improving Web-based Image Search via Content Based Clustering", in the Proceedings of the IEEE 2006 Conference on Computer Vision and Pattern Recognition Workshop, Jun. 17, 2006, 6 pages.
Berg et al., "It's All About the Data", in the Proceedings of the IEEE , Vo. 98, No. 8, Aug. 2010, pp. 1434-1452.
Davis, et al., "From Context to Content: Leveraging Context to Infer Media Metadata", MM'04, Oct. 10-16, 2004, New York, NY, USA, 8 pages.
Krapac, et al., "Improving web image search results using query-relative classifiers", IN: Comp. Vision & Pattern Recognition, Jun. 13-18, 2010, IEEE, 2010, pp. 1094-1101.
Merler et al., "Recognizing Groceries in situ Using in vitro Training Data", in the Proceedings of the 2007 IEEE conference on Computer Vision and Pattern Recognition, Jun. 17, 2007, 8 pages.
Final Office Action for U.S. Appl. No. 13/110,282 mailed on May 19, 2016, Xin-Jing Wang, "Text to Image Translation", 17 pages.
Sarvas, et al., "Metadata Creation System for Mobile Images", MobiSys'04, Jun. 6-9, 2004, Boston, MA, USA, pp. 36-48.
Wang et al., "Buidling text features for object image classification", in the Proceeding of the 2009 IEEE Conference on computer Vision and Pattern Recognition, Jun. 20, 2009, 8 pages.
European Office Action mailed Sep. 5, 2016 for European Patent Application 07795180.4, a counterpart foreign application of U.S. Pat. No. 8,341,112, 5 pages.
Office action for U.S. Appl. No. 12/790,772, mailed on Sep. 12, 2016, Wang, et al., "Associating Media With Metadata of Near-Duplicates", 21 pages.

(56) References Cited

OTHER PUBLICATIONS

Office action for U.S. Appl. No. 14/547,941, mailed on Sep. 21, 2016, El-Saban et al., "Real-Time Annotation and Enrichment of Captured Video", 12 pages.

* cited by examiner

300
Direct Map

400
Data Driven Mapping

ASSOCIATING MEDIA WITH METADATA OF NEAR-DUPLICATES

BACKGROUND

Electronic search for digital objects on a computer, over a network, or over the Internet presently relies on textual search techniques. However, textual search techniques have minimal applicability for digital objects that are not comprised of text, such as still images, videos, audio files and multimedia objects in general.

Efforts to search on non-textual digital objects have included search on attributes intrinsic to an image, such as content-based image recognition. Such approaches may make use of global attributes, such as color histograms, or local attributes, such as object recognition. Search for non-textual digital objects on intrinsic attributes have meet with mixed success and are often supplemented by other search techniques. Because intrinsic attributes for an image are unchanging, search accuracy improvement may require associating additional data to the non-textual digital object.

Associating textual data with digital objects allows text search techniques to be leveraged on otherwise non-textual digital objects. Textual data may be associated by various techniques such as overloading file names, adding meta-tags, and associating links to data stores containing meta-tags. Searching for digital objects by searching their metadata, alone or in combination with other search techniques, have yielded improved results.

One difficulty with associating text metadata with digital objects is that near-duplicates of objects create either redundant records, or disperse tags. A near-duplicate is a digital object that stores similar data, but has slight differences in attributes not of interest to searching users. For example, if there are two photos of the Eiffel tower in a data store, one taken at 12:00 Noon, the other at 11:00 AM but under similar lighting conditions and from similar angles, in effect, the two photos are duplicates of each other. The photos are not exact duplicates, because of the small variances of lighting and angle, but the data clearly represents the Eiffel tower and shows similar features of the Eiffel tower.

As near-duplicates, the two photos of the Eiffel tower may be considered redundant. At best both photos will have tags with the name of the Eiffel Tower. From that perspective, it might be better to keep the best photo and eliminate the near-duplicate in order to eliminate redundancy. However, over time, some users will add tags to the first photo and others will add tags to the second photo. Thus the first photo may be tagged with "Paris, France" and the second photo may be tagged with, "1889 World's Fair". Here, because of the existence of near-duplicates in the data store, the tags for a photo of the Eiffel tower have been dispersed. A query for the 1889 World's Fair will obtain the second Eiffel tower photo but not the first, and a query for Paris, France, will obtain the first Eiffel tower photo, but not the second.

For these and other related reasons, near-duplicates are not only presently disfavored, but are also often removed from digital object data stores. However, it may be impractical to remove near-duplicates from a data store. The photos may be dispersed over several stores or over the Internet, where a user would not have privileges to delete digital objects.

SUMMARY

Disclosed herein are techniques for automatically associating a non-textual digital object used in a query, i.e. a query media object, with data associated with near duplicates of the non-textual digital object. Specifically, these techniques include identifying near-duplicates of a query media object, extracting metadata associated with near-duplicates of the query media object, mining the extracted metadata for key terms, and then associating extracted metadata with the query media object to enable discovery of the media object based on the extracted metadata.

This summary is provided to introduce concepts relating to an improved configuration and platform for search of non-textual digital objects making use of information from near-duplicates. These techniques are further described below in the detailed description. This summary is not intended to identify essential features of the claimed subject matter, nor is it intended for use in determining the scope of the claimed subject matter.

BRIEF DESCRIPTION OF THE DRAWINGS

Non-limiting and non-exhaustive examples are described with reference to the following figures. In the figures, the left-most digit(s) of a reference number identifies the Fig. in which the reference number first appears. The use of the same reference numbers in different figures indicates similar or identical items or features.

DETAILED DESCRIPTION

Overview

Described herein are approaches for auto-tagging digital media objects. Specifically, these approaches relate to associating a digital media object with metadata of near-duplicates of that digital media object. Digital media objects include, but are not limited to, digital still images, digital video files, digital audio files, text and combinations thereof. Digital media objects may also include persistence documents for office productivity applications such as for word processing, spreadsheets, presentation graphics, and electronic mail. Associating metadata includes any association of data with a digital media object in order to facilitate automated search of that object. Association includes, but is not limited to, adding search terms in a file name, associating metatags with the digital media object, and embedding metadata in a binary representation of the digital media or associating links in a database between an identifier of the media object and the metadata.

A first digital media object is a near-duplicate of a second digital media object if the first digital media object that stores similar data as the second digital media object, but has slight differences in attributes not of interest to searching users. Attributes of interest are referred to herein as "similarity attributes" and are used to determine whether a digital media object is a near-duplicate or not. If a first and a second digital media object are found to be near-duplicates, then the metadata associated with the first digital media object should be related to the second digital media object, and vice versa. In other words, knowledge that two digital media objects were near-duplicates would be an indicator that metadata could be exchanged, thus providing a basis for automating metadata association.

Figure 1:
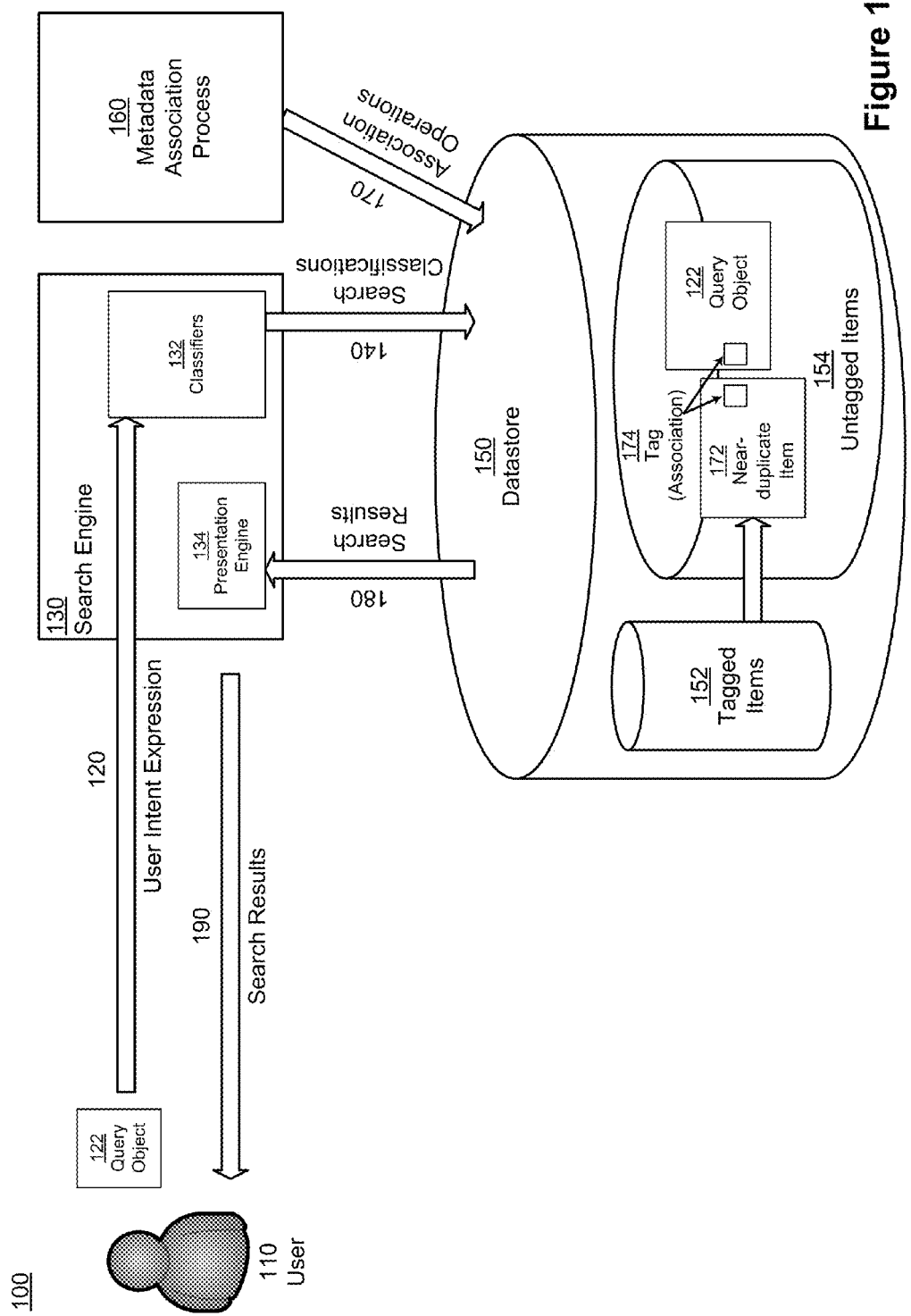
FIG. 1 is a system diagram supporting techniques for associating metadata from near-duplicates with a media object.

FIG. 1 illustrates an example embodiment to leverage near-duplicates for automatic metadata association in the context of a search engine scenario. As shown, a user 110 executes a digital media search. The user 110 may be a human being or an executing process.

The search starts with the user 110 providing a user intent expression 120 which indicates what the user desires to find. This could come in the form of a text query, or it could come in the form of providing a representative query object 122, such as a still image. For example, if user 110 wanted pictures of the Eiffel tower, the user 110 might provide a digital still image of the Eiffel tower as a query object. Note that the digital still image might also be relevant for retrieving video clips, since a search engine may find videos comprised of individual frames with the Eiffel tower.

The user intent expression 120 is entered into a search engine 130. One way to search for digital media is to take a query object 122, and apply classifiers 132 to classify the content of the query object 122. The classifiers would generate search classifications 140 that could be used to query a datastore of digital media objects 150 for relevant search results. Search classifications 150 could be a hierarchy or network of concepts stored as text. Such a network of concepts could be augmented with ontologies, synonym dictionaries and foreign language dictionaries to expand the key terms and key phrases that could express a concept.

Datastore 150 contains digital media objects, some of which are tagged 152, and others which are not tagged 154. The digital media objects that are tagged 152 need not be stored separately from the untagged items 154. The separation in FIG. 1 is merely for illustrative purposes. In practice, most items will be tagged, albeit incompletely.

Search engine 130 forwards query object 122 and search classifications 140 to datastore 150. As the datastore 150 retrieves digital media objects satisfying the search classifications 140, a metadata association process 160 executes association operations 170 to associate metadata with the query object 122. Specifically, datastore 150 will produce some near-duplicate items 172 that are associated with metadata 174. Assuming query object 122 is not associated with any metadata, the association operations 170 will read metadata 174 from the near-duplicate item 172 and associate it with query object 122, thereby automatically tagging hitherto untagged query object 122. It's possible that query object 122 was already associated with metadata. In that case, the association operation 170 would be to determine if metadata 174 of near-duplicate 172 was already associated with query object 122. If it wasn't, then metadata association process 160 would proceed to associate the new metadata with query object 122. Otherwise, no association would be performed.

Afterwards, the datastore 150 returns search results 180 to the search engine 130 where a presentation engine 134 displays a formatted version of the search results 190 to user 110. During this process, the automatic association of metadata with the query object 122 is transparent to user 110.

Example Hardware Environment

Figure 2:
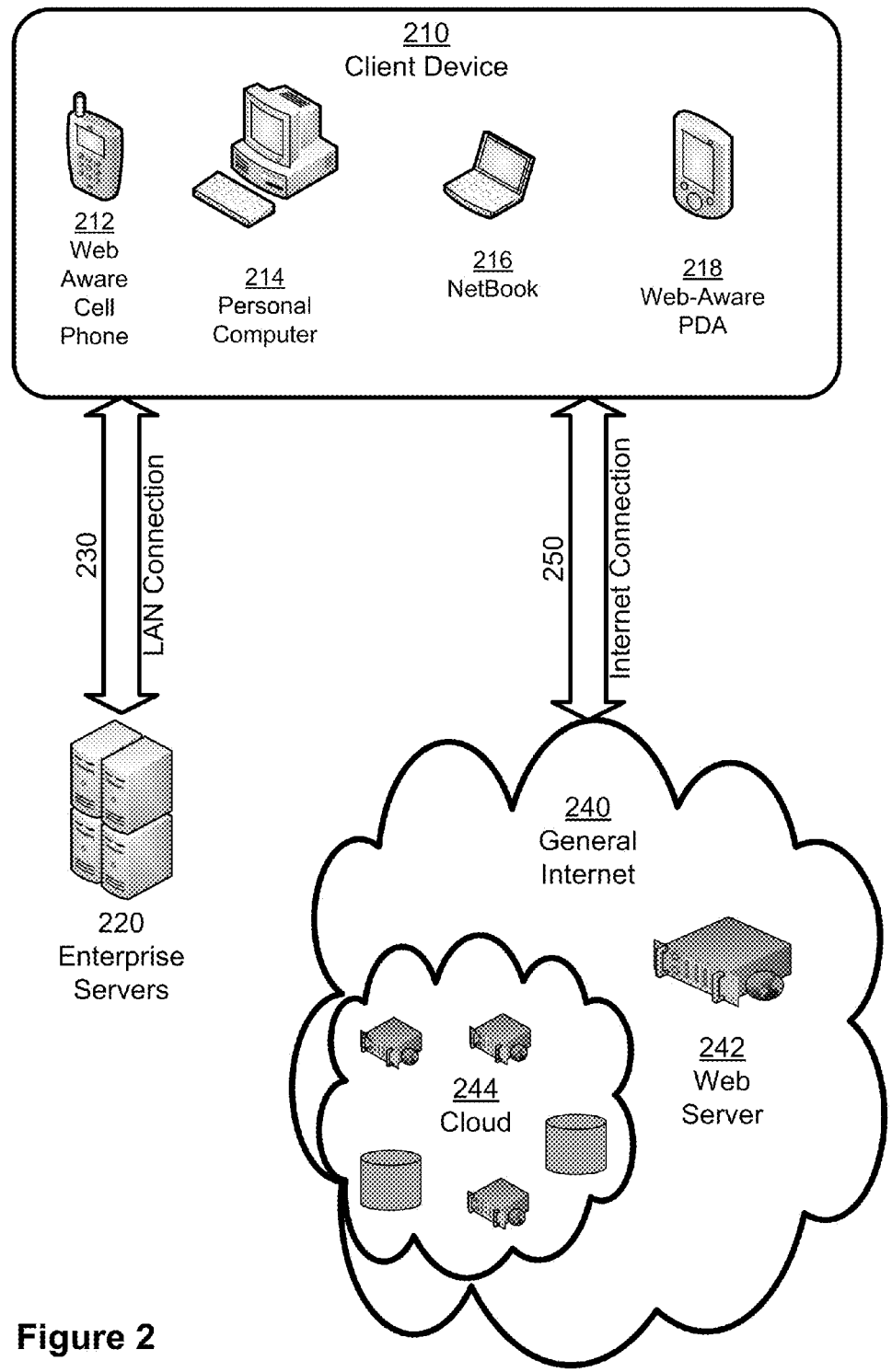
FIG. 2 illustrates an example hardware environment for supporting techniques for associating metadata from near-duplicates.

FIG. 2 illustrates an example hardware environment 200 for associating a digital media object with metadata of its near-duplicates. Specifically, FIG. 2 illustrates an exemplary hardware environment 200 to host a metadata association process and applications using a metadata association process.

The metadata association process is capable of being hosted on a wide range of client devices 210. If an application using a metadata association process is embodied in a web page, the client device may be any web-aware client, including but not limited to a cell phone 212, personal computer ("PC") 214, netbook 216, or web aware personal device assistant ("PDA") 218. If an application utilizing the metadata association process is embodied in a windowed application, it may be hosted on a PC 214 or netbook 216. PC 214 may include any device of the standard PC architecture, or may include alternative personal computers such as the MacIntosh™ from Apple Computer™, or workstations including but not limited to UNIX workstations.

An application using a metadata association process on a client device 210 may then access a search engine or application server hosted on an enterprise server 220 or a server hosted on the Internet 240.

If the application using a metadata association process is accessing an enterprise server 220 on a local area network ("LAN"), it may connect via any number of LAN connectivity configurations 230. At the physical layer this may include Ethernet™ or Wi-Fi™. At the network/session/transport layer this may include connectivity via the Transmission Control Protocol/Internet Protocol ("TCP/IP") or other protocol. If an application utilizing the metadata association process is accessing the Internet 240, it may connect via standard internet protocols including TCP/IP for the network/session/transport layer and Hypertext Transfer Protocol ("HTTP") at the application layer.

Enterprise server 220 may be based on a standard PC architecture, or on a mainframe.

If accessing the Internet 240, an independently hosted web server 242 may be accessed. A web server 242 may be a standard enterprise server based on a standard PC architecture that hosts an application server. In various embodiments, application server software includes Internet Information Server™ ("IIS") from Microsoft Corporation™ or Apache Web Server, an open source application server. Web server 242 may access a database server also potentially on a standard PC architecture hosting a database. Exemplary databases include, Microsoft SQL Server™ and Oracle™. In this way an application utilizing the metadata association process may run on two-tier or three-tier platforms.

Alternatively, an application using a metadata association process or the metadata association process itself may be hosted on a cloud computing service 244. Cloud computing service 244 contains a large number of servers and other computing assets potentially in geographically disparate locations. These computing assets may be disaggregated into their constituent CPUs, memory, long term storage, and other component computing assets. Accordingly, the metadata association process, the search engine, and a digital media object datastore, when hosted on cloud computing service 244, would have both centralized and distributed data storage on the cloud, accessible via a data access API such as Open Database Connectivity ("ODBC") or ADO.Net™ from Microsoft Corporation™. An application using a metadata association process would be hosted on computing assets in the cloud computing service 244 corresponding to an application server.

Direct Mapping and Data-Driven Mapping

Figure 3:
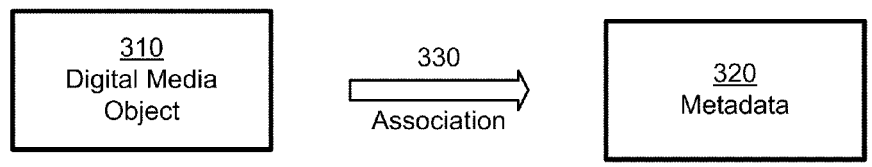
FIG. 3 is a block diagram illustrating direct mapping of tags to a multimedia artifact.
Figure 4:
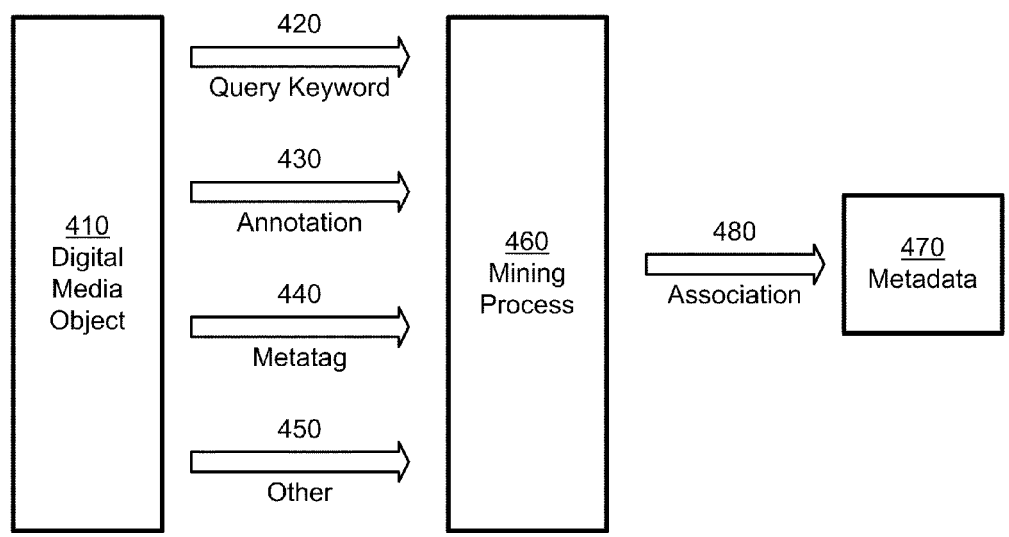
FIG. 4 is a block diagram illustrating data-driven mapping of tags to a multimedia artifact.

In various embodiments, a metadata association process performs semantic and other analyses prior to associating metadata with a digital media object. To better illustrate the introduction of semantic information with metadata association, FIG. 3 shows direct mapping 300 of a digital media object 310 with a metadata item 320. FIG. 4 illustrates data-driven metadata mapping 400 where the association of a digital media object 410 with a metadata item 470 includes additional semantic analysis.

In FIG. 3, a digital media object 310 is analyzed and various candidates for metadata are generated. For example, a digital image 310 of Susan Smith wearing a red dress in Paris in front of Pierre's Boulangerie would potentially have metadata items 320, "Susan Smith", "red", "Paris" and "Pierre's Boulangerie" all associated with the digital image. Because all the candidate metadata items 320 are accurate, an association 330 is performed for all of these items.

However, no semantic analysis to filter the associations 330 is performed with direct mapping 300. As a result, the associations 330 are heterogeneous and can create unexpected query results. In our example, our digital image 310 of Susan Smith might be retrieved along with a digital image of Red Square in Moscow, and a red flag of China. Certainly semantic analysis might be performed in the search engine to remove the images of Red Square and the red flag as not relevant, but this illustrates that there is benefit to performing semantic analysis to filter associations.

In FIG. 4, a digital media object 410 is analyzed for many different sources of metadata 470. The metadata 470 may be in the form of a query keyword 420 associated with images clicked on in a query result set. Alternatively, there may be annotations 430 or metatags 440 associated with the digital media object 410 already. Yet other sources of metadata 450 exist, including commentary, descriptive file names and surrounding text from web pages where the digital media object 410 is hosted.

Mining process 460 collects the candidates, performs analysis to determine the best metadata 470 to associate with digital media object 410, and then performs and stores the association 480. The process of collecting candidate metadata 470 is discussed in more detail below with respect to FIG. 7. The process of mining the candidate metadata 470 is discussed in more detail below with respect to FIG. 8.

Example Method to Automatically Associate Metadata from Near-Duplicates

Figure 5:
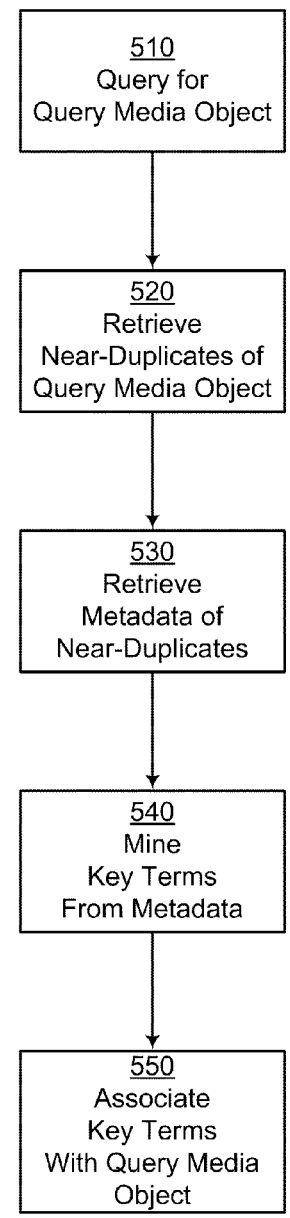
FIG. 5 is a flowchart of an example embodiment for associating metadata from near-duplicates with a media object.

FIG. 5 illustrates an example embodiment of the metadata association process 500 in the context of a query operation and metadata mining. Specifically, the metadata association process 500 will associate metadata to a query media object, from metadata associated with the query media object's near-duplicates.

In query step 510, user intent is obtained for the metadata association process. User intent may come in the form of a query media object which provides an example from which to search other digital media objects. The query media object may be specified by identifying it by its file name with a fully qualified path, or by a reference identifier if the query media object is stored in a database. Alternatively, a user might actually uploading a binary large object (BLOB) comprising the query media object. The query media object may also be indirectly specified by entering a text query, which in turn identifies a query media object. In this scenario, a user may explicitly select one of the objects returned by the query as the query media object, or a search engine may select a top ranked result of the objects returned by the query as the query media object.

In retrieval step 520, a search engine retrieves digital media objects that are similar to the query media object. The search engine may use classifiers to retrieve digital media objects with similar metadata to the query media object. However, because the query media object does not necessarily have any tags, similarity attributes are identified in the query media object, and then used to query the search engine. While similarity attributes are generally local, as via object identification, similarity attributes may also be global such as via matching color histograms.

At least some of the digital media objects retrieved in step 520 may be near-duplicates. There currently exist many algorithms to determine whether a query media object and a digital media object are near-duplicates.

For better performance, near-duplicates may be referenced in a previously prepared index in the datastore. During a pre-processing phase, all digital media objects in a datastore may be scanned. Where a first digital media object is determined to be a near-duplicate of a second digital media object, a link indicating that the first and second media objects are near-duplicates of each other is stored. One approach to determining whether a first digital media object and a second digital media object are near-duplicates is to extract similarity attributes from a first digital media object and similarity attributes of a second digital media object. If the similarity attributes from the first and second digital media objects are within a predetermined threshold, then the first and second digital media objects are deemed to be near-duplicates.

With a previously prepared index, performance may improve responsiveness such that applications utilizing the metadata association process may be performed on-line and interactively. Specifically, the application may perform a query with a query media object, associate near-duplicate metadata with the query media object, and return search results all in the same session.

The link may be in the form of a cross reference indicating that the first and second media objects are related. Alternatively, the link may be in the form of a conceptual class where the first and second media objects are associated with that conceptual class. Specifically, a first media object is known to belong to a conceptual class. When a second media object is determined to be a near-duplicate of the first media object, the conceptual classes that the first media objects belong to are determined and then associated with the second media object.

Another way to determine whether a first media object and a second media object are near-duplicates is to compare visual words associated with each media object. A visual word is the result from a vector quantization on a visual feature extracted from a media object, such as a sift or a color histogram. An inverted index is built in which each visual word is a key that is mapped to the media object from which the visual word was extracted. Accordingly, media objects with visual words in common, or with similar visual words may be retrieved, the similarity of their attributes as represented by the visual words compared, and where the similarities are within a predetermined threshold, those media objects may be considered near-duplicates.

In metadata collection step 530, digital media objects determined to be near-duplicates in 520 are analyzed, and their metadata extracted. The process of collecting candidate metadata is discussed in more detail below with respect to FIG. 7.

In metadata mining step 540, the metadata collected in step 530 is mined for key terms. Terms may be single words or may be multiple word phrases. Metadata mining step 540 is not merely extractive in nature, but also is evaluative. Accordingly, metadata mining step 540 may comprise removing extraneous words or terms from candidate metadata as well as measuring the relevance of candidate metadata.

In metadata association step 550, the metadata identified for association by metadata mining step's 540 evaluations is formally associated with the query media object. If the query media object is already associated with a metadata item, the item is ignored as to avoid redundancy. Alternatively, the metadata item may be marked for greater weight during for queries. The association may be stored in multiple techniques including, but not limited to, metadata tags, metadata embedded in the binary representation of the digital media object and metadata stored in a database cross referenced to an identifier of the digital media object.

Example Method to Mine and Reconcile Metadata

Figure 6:
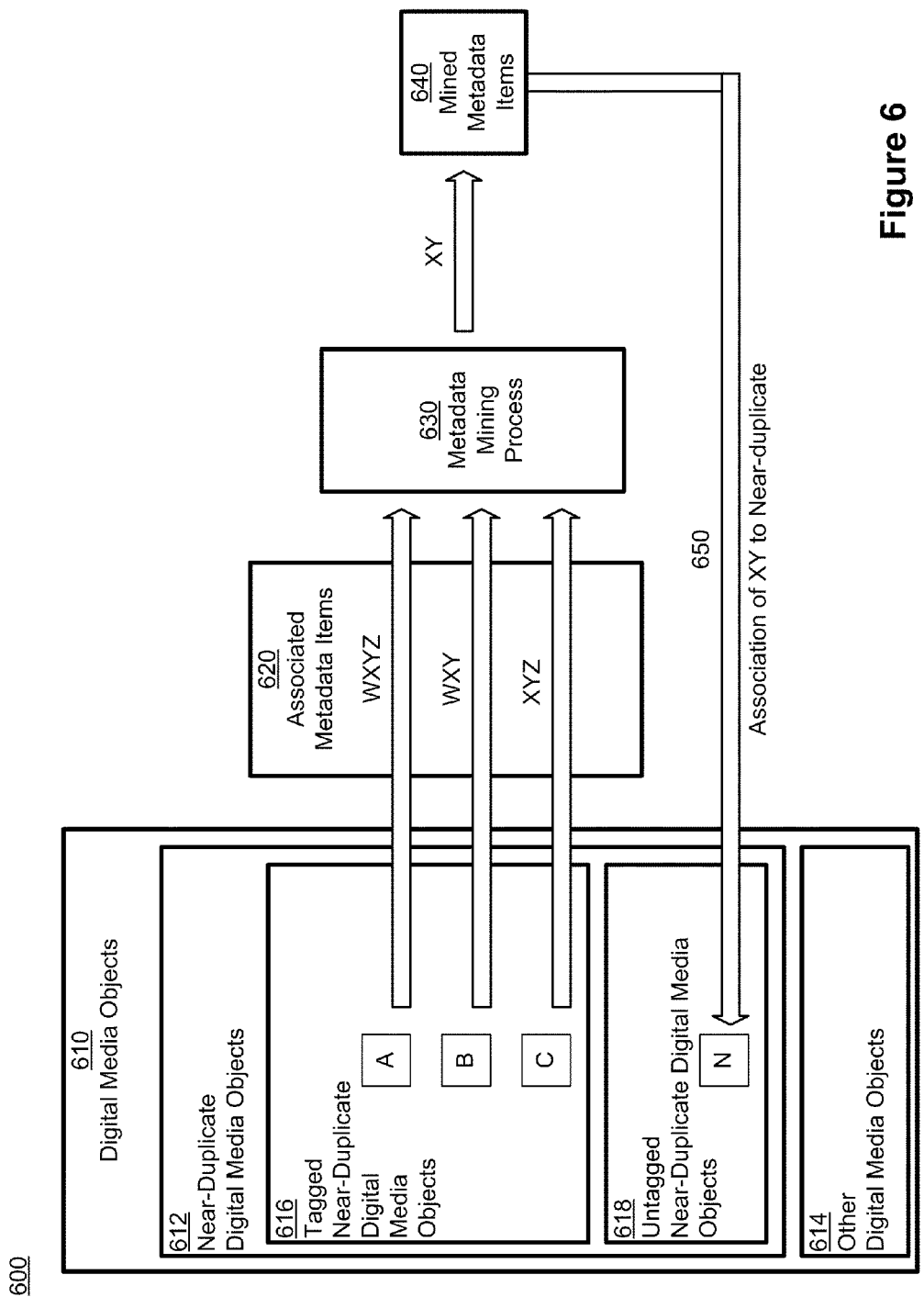
FIG. 6 illustrates an example embodiment for mining and reconciling metadata from near-duplicates.

FIG. 6 illustrates an example embodiment of mining and reconciling metadata.

Digital media objects 610 may reside in the same or different datastores. Digital media objects 610 may be known to be near-duplicates of each other and in the same conceptual class 612. Some of these digital media objects will be tagged 616 and others will be untagged 618. Digital media objects A, B, C and N are known to be in the same conceptual class 612, but A, B and C are tagged 616 but N is not tagged 618.

Box 620 indicates that the metadata items associated with A, B and C are extracted. A is associated with metadata W, X, Y and Z. B is associated with metadata W, X and Y. C is associated with metadata X, Y and Z. External data including, but not limited to, ontologies, synonym dictionaries and foreign language dictionaries may be used to increase the set of metadata to potentially extract from. For example, if W' was a synonym of W per a synonym dictionary, then it may have been extracted as candidate metadata for further evaluation. If Z' was a Russian term for English term Z, then Z' per an English-Russian dictionary, it too might have been extracted as candidate metadata for further evaluation.

Metadata mining process 630 consolidates and evaluates the extracted metadata from 620. In the illustrated example, metadata X and Y are extracted as the mined metadata items 640. X and Y were selected because they were the only terms in common associated with A, B and C. Other rules could have also been implemented involving external engines, including, but not limited to, a statistical machine learning engine or a rules engine.

In 650, the mined metadata items 640 X and Y are associated with untagged near-duplicate digital media object N 618, in the same near-duplicate conceptual class 616 of A, B and C. In some embodiments, untagged near-duplicate digital media object N 618 could have been an external query media object.

Example Method to Mine Metadata

Figure 7:
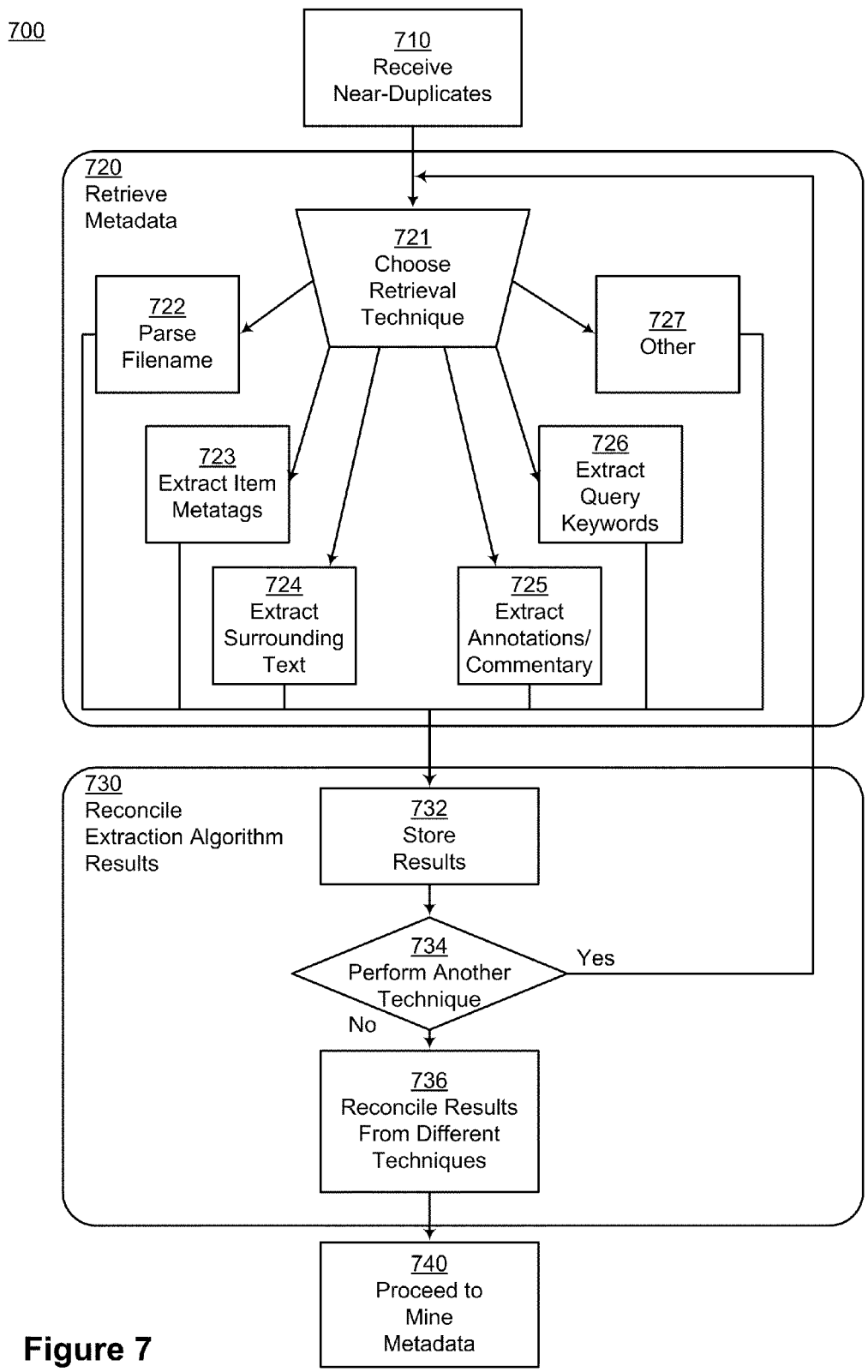
FIG. 7 is a flowchart of an example embodiment for retrieving metadata in support of associating metadata from near-duplicates.

FIG. 7 provides an illustration of the metadata retrieval step 710 as expanding on step 530 of FIG. 5. Specifically, metadata for a single near-duplicate is extracted.

A near-duplicate digital media object is received for consideration in step 710. The near-duplicate is obtained per step 520 of FIG. 5.

In 720, metadata associated with the near-duplicate digital media object is extracted. There are multiple ways to extract metadata, thus in step 721, a metadata extraction technique is selected. The metadata extraction technique may be predetermined or it may be selected dynamically either by a person or an automated process.

Metadata extraction techniques include, but are not limited to: (1) parsing the filename for embedded metadata 722; (2) extracting metadata from the near-duplicate digital object 723, (3) extracting the surrounding text in a web page where the near-duplicate digital object is hosted 724, (4) extracting annotations and commentary associated with the near-duplicate from a web site supporting annotations and commentary where the near-duplicate digital media object is stored 725; and (5) extracting out query keywords that were associated with the near-duplicate when a user selected the near-duplicate after a text query 726. In other embodiments, metadata extraction techniques may involve other operations 727.

Some of the metadata extraction techniques start with a body of text and sift out the most concise metadata. Accordingly, techniques such as parsing against a grammar and other token-based analysis may be utilized. For example, for 724, surrounding text for an image may include a caption or a lengthy paragraph. At least in the latter case, the lengthy paragraph may be parsed to extract out terms of interest. By way of another example, for 725, annotations and commentary data are notorious for containing text abbreviations (e.g. IMHO for "in my humble opinion") and emotive particles (e.g. smileys and repeated exclamation points). IMHO, despite its seeming emphasis in annotations and commentary, is likely to be a candidate for filtering out where searching for metadata.

In the event multiple metadata extraction techniques are chosen in 720, reconciliation step 730 provides a way to reconcile potentially conflicting candidate metadata results. Candidate metadata is stored in storing step 732. If another metadata retrieval technique is to be performed, control moves to step 721. Otherwise, the metadata stored in 730 is reconciled in step 736 as described in items 630 and 640 in the discussion with respect to FIG. 6. Reconciliation may also be effected by other means including, but not limited to statistical analysis and machine learning or alternatively via rules engines.

Once the final metadata has been identified, control proceeds on to mine metadata in step 740.

Figure 8:
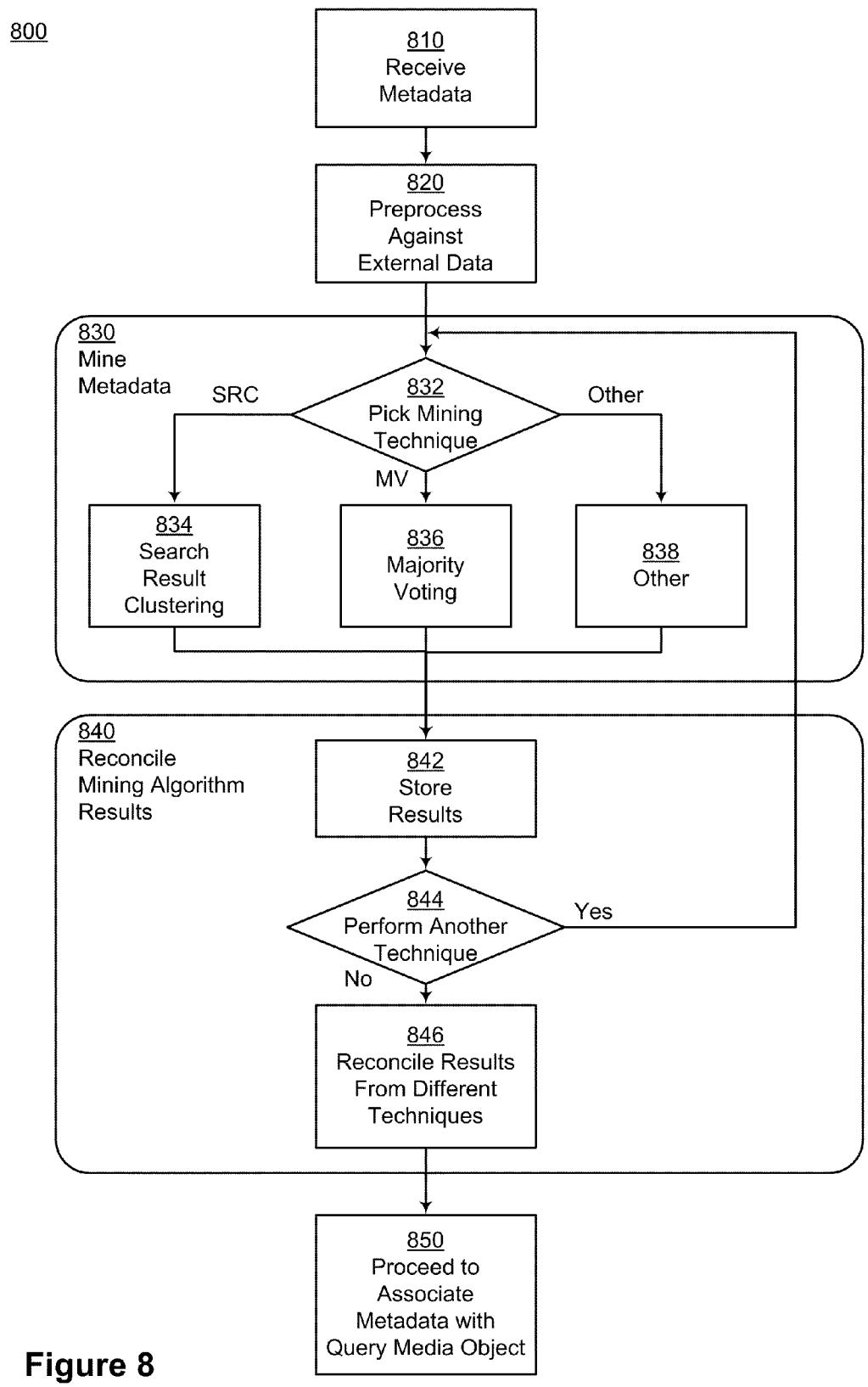
FIG. 8 is a flowchart of an example embodiment for mining metadata in support of associating metadata from near-duplicates.

FIG. 8 illustrates an example embodiment of mining metadata. Specifically, FIG. 8 illustrates how to select metadata from a single near-duplicate metadata source or from metadata consolidated from multiple near-duplicate metadata sources.

In metadata receiving step 810, metadata from one or more near-duplicate metadata sources are received as per step 740 in FIG. 7.

In preprocessing step 820, external data including, but not limited to, ontologies, synonym dictionaries and foreign language dictionaries are accessed. Accordingly, the received metadata is expanded to include synonyms, foreign equivalents and data considered relevant by an inference engine operating against an ontology. Once preprocessing 820 is completed, a body of metadata is ready for mining.

Mining metadata step 830 allows multiple techniques to be chosen to find metadata candidates to associate with a query media object. In 832, a mining technique is chosen.

The mining technique may be predetermined or it may be selected dynamically either by a person or an automated process.

Mining techniques include, but are not limited to: (1) Search Result Clustering (SRC) and (2) Majority Voting (MV). SRC, shown at 834, is a well known technique based on pre-learnt statistical regression models which score n-grams in results. Alternatively, MV, shown at 836, is a well known technique that measures the frequency a term is associated with a digital media object, and favors high-frequency terms.

Other mining techniques 838 not explicitly described may alternatively be chosen as well. Examples include, but are not limited to searching the text associated with a media object for terms and phrases in a vocabulary of terms and phrases. Instances of each term and phrase may be counted. Where the counts exceed a predetermined threshold, the corresponding term or phrase may be considered to be metadata. Alternatively, the counts may weighed in favor of certain terms and phrases, or other statistical variations on measuring the frequency of the terms and phrases may be applied in scoring confidence in the mined metadata. Mined metadata with high confidence scores may then be sent to the next step.

Reconciliation step 840 provides the means to reconcile different results from different mining algorithms in 830. A mining technique's results are stored in step 842. If another mining technique is to be performed, then control is returned to step 832 where another mining technique is chosen. Otherwise, the results from the different mining algorithms 830 are reconciled in step 846 as described in items 630 and 640 in the discussion with respect to FIG. 6. Reconciliation may also be affected by other means including, but not limited to statistical analysis and machine learning or alternatively via rules engines.

When the mining algorithm results are reconciled in 840, the final metadata results are associated with the query media object in 850 as described in the discussion with respect to step 550 in FIG. 5.

Extended Environment for the Metadata Association Process

Figure 9:
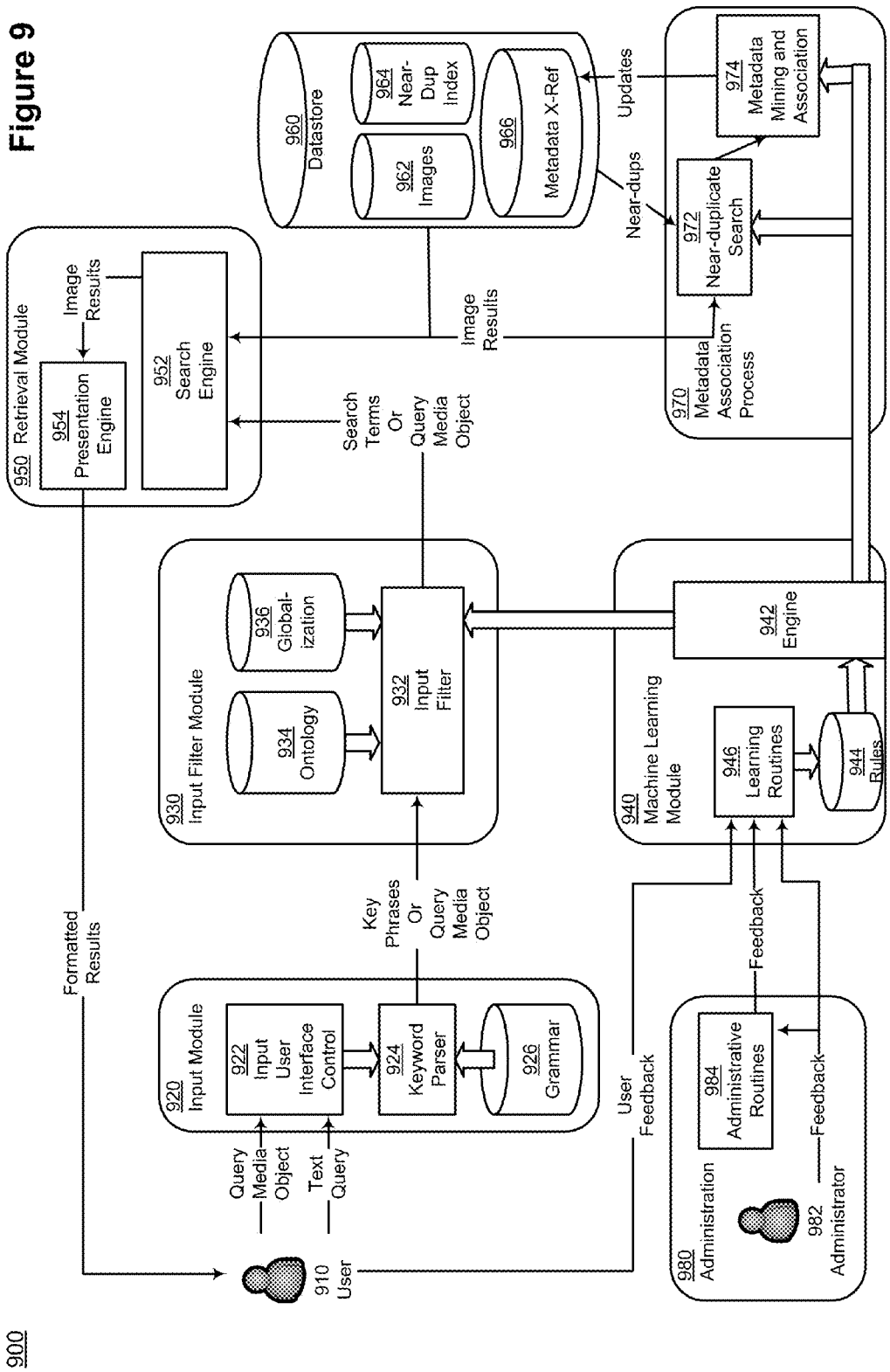
FIG. 9 is a diagram of an example on-line, interactive embodiment of the metadata associating, in accordance with various embodiments.

The preceding discussion discloses various ways to extend the environment for the metadata association process. FIG. 9 illustrates an example extended environment for the metadata association process including, but not limited text query input, parsing against a grammar, ontologies, foreign language dictionaries, machine learning and rules engines.

A user 910 enters an expression of user intent. This expression may come in the form of either a query media object, or a text query by which a query media object is extracted.

Input module 920 receives the user intent with a user interface control 922. If the user intent is a query media object, then no processing by the input module 920 is necessary. However, if the user intent is in the form of a text query, the query should be parsed for keywords or key phrases with a parser 924 which operates against a grammar 926. The parsed keywords or key phrases are then forwarded to an input filter module 930.

In the previous discussions with respect to FIGS. 7 and 8, ontologies, synonym dictionaries and foreign dictionaries were applied to the retrieval and mining techniques. Here, ontologies, synonym dictionaries and foreign dictionaries may be applied to the key phrases from the input module 920. Specifically, each key phrase is analyzed and inferred data, synonyms, or foreign equivalents are retrieved from ontologies, synonym dictionaries and foreign dictionaries, respectively. Processing may be assisted by a machine learning module or a rules engine as embodied in machine learning module 940. The result is a set of search terms to forward to the search engine 950. If the user intent is expressed via a query media object, processing by the input filter module 930 may be skipped.

Machine learning module 940 comprises an engine 942, rules 944, and learning routines 946. Engine 942 provides an inference engine to provide guidance on input filter module 930. The engine makes inferences based on rules 944. The rules 944 may be predetermined. Alternatively, machine learning routines 946 may add, remove, or modify rules 944 based on external feedback. External feedback may cover from end users 910 or may come from an administration function 980. The administration function 980 is discussed below.

If the user intent was expressed in a text query, then search terms are forwarded to the retrieval module 950. If the user intent was expressed as a query media object, then the query media object is forwarded to the retrieval module 950. Search terms or query media object are forwarded specifically to search engine 952. Search engine 952 will access datastore 960 including but not limited to images 962.

If search terms are forwarded to the search engine 952, then search engine 952 will perform a text search against any metadata 966 associated with an images 962. Otherwise, if a query media object is forwarded to the search engine 952, then similarity attributes are extracted from the query media object and a search on those attributes performed.

When the image results are retrieved, then 952 will forward the image results to presentation engine 954 for formatting and presentation to user 910 as specified by an application. Sample applications are discussed below with respect to FIG. 10.

Datastore 960 comprises image store 962, a near-duplicate index 964, and a metadata store 966. Image store 962 is not limited to still images, but may contain any digital media object. Near-duplicate index 964 may be generated via a preprocessing step which stores a link between images in 962 that are near-duplicates of each other. Metadata store 966 may store the metadata itself cross referenced to identifiers of the images in 962. In this embodiment, the metadata has already been extracted from external sources, and has been proactively stored in 966. This alternative obviates the need to retrieve metadata dynamically, but increases the storage requirement.

Search engine 952 then forwards the query media object to the metadata association process 970. If the user intent was expressed as a text query, then search engine 952 then ranks the image results from datastore 960, and then selects at least the most relevant item, and forwards it to the metadata association process 970.

Near-duplicates for the query media object are then retrieved from datastore 960. For speed, near-duplicates are retrieved with near-duplicate search 972 using index 964. Specifically items indexed as a near-duplicate of the query media object in 964, or alternatively in the same conceptual class of the query media object in 964 are retrieved by near-duplicate search 972.

Near-duplicate search 972 also retrieves metadata associated with the retrieved near-duplicates. In this embodiment, the near-duplicate metadata is stored in 966. However, 972 could be modified to perform dynamic metadata retrieval as discussed with respect to FIG. 7.

The retrieved metadata is then mined and associated with 974. The mining and metadata association in 974 is as discussed with respect to FIG. 8. In this embodiment, the metadata store 966 is updated to reflect the association of metadata with the query media object.

Machine learning module 940 may provide external rules to near-duplicate search 972 and the metadata mining process 974. Although not illustrated in FIG. 9, external data including, but not limited to, ontologies, synonym dictionaries and foreign language dictionaries may supplement the metadata association process 970 as described with respect to FIGS. 7 and 8.

Administrative function 980 may cover from a human administrator 982 or from administrative utilities and routines 984. FIG. 9 illustrates feedback in the form of providing feedback to the machine learning module. In combination with feedback from a user 910, there are many intervention points in this embodiment. In fact, in practice, an administrator may intervene not only via the machine learning module, but via any of the application modules, processes and datastores 920, 930, 950, 960 and 970.

Example Applications

Figure 10:
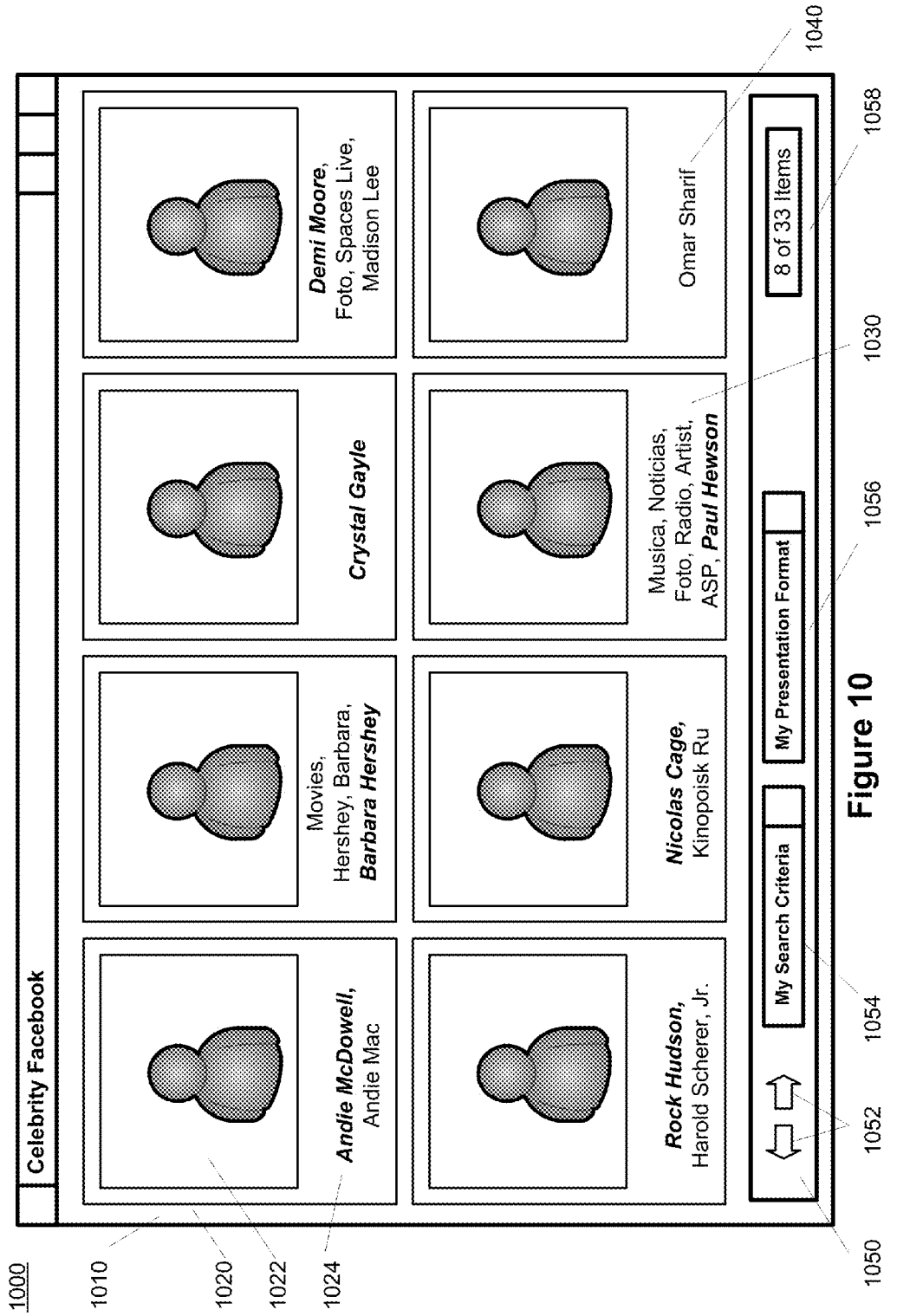
FIG. 10 is a diagram of an example application of the metadata associating, in accordance with various embodiments.

FIG. 10 illustrates an example application user interface 1000 utilizing the metadata association process. Specifically, FIG. 10 illustrates a celebrity facebook 1000. In this celebrity facebook 1000, images of celebrities may be searched, and displayed along with their associated metadata.

User interface window 1010 provides a pane from which to view images and metadata.

Each retrieved celebrity is displayed in a record box 1020, comprising an image of the celebrity 1022 and associated metadata 1024.

In this embodiment, the most relevant metadata 1024 is bolded. Relevant metadata may be metadata from highly trusted sources, or otherwise known to be both accurate and of interest. However, less relevant metadata remains unbolded 1030. In 1030, the image is of Paul Hewson, but more generalized metadata, such as "artist" or "musica" is de-emphasized by not being bolded. Where an image's metadata fails to meet a predetermined threshold, it may be the case as in 1040 that no metadata is bolded.

Navigation of the celebrity records may be affected by a control bar 1050. Here, control bar 1050 comprises next/previous navigation arrows 1052, a search query box 1054, a drop down box to choose different presentation layouts 1056, and a record count label 1058.

While FIG. 10 has been directed to a celebrity facebook, the applications based on the metadata association process may apply to any circumstances where digital media objects are to be aggregated, and metadata from near-duplicates correlated. Other applications may include a landmark visual dictionary where images of different landmarks and their associated metadata are displayed. Alternatively, the metadata application process may be componentized for use to supplement other types of applications.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method comprising:
retrieving a plurality of media objects responsive to a query media object presented to a search engine;
extracting first visual words from the query media object, at least one of the first visual words being a vector quantization of a visual feature extracted from a media object;
generating an inverted index mapping a plurality of visual words corresponding to individual media objects of the plurality of media objects;
identifying near-duplicate media objects from the plurality of media objects based at least on analyzing the first visual words with respect to the inverted index and retrieving the individual media objects having at least one of the plurality of visual words with similarities to the first visual words greater than a predetermined threshold;
extracting metadata from the near-duplicate media objects to form extracted metadata;
storing the extracted metadata in a datastore as a set of metadata;
increasing the set of metadata in the datastore based, at least in part, on a synonym dictionary;
mining the set of metadata in the datastore to produce consolidated extracted metadata, wherein the mining the set of metadata includes utilizing a globalization data store, which maps terms from a first language to analogous terms in a second language;
evaluating the consolidated extracted metadata to determine one or more metadata items that are common among the near-duplicate media objects; and
associating the one or more metadata items that are common among the near-duplicate media objects with the query media object as one or more descriptors of the query media object to enable discovery of the query media object based on the one or more descriptors.

2. The method of claim 1, wherein the query media object is selected from the following: a still image, a video file and an audio file.

3. The method of claim 1, wherein the identifying the near-duplicate media objects includes utilizing a previously prepared index of near-duplicates.

4. The method of claim 1, wherein the extracting metadata further comprises one or more of parsing a filename, extracting metatags, extracting surrounding text, extracting annotations, or extracting commentary.

5. The method of claim 1, wherein the extracting metadata further comprises:
applying a first metadata extraction technique to extract first metadata,
applying a second metadata extraction technique to extract second metadata,
reconciling the first metadata and the second metadata into identified metadata suitable for the mining the extracted metadata to determine the one or more metadata items that are common among the near-duplicate media objects.

6. The method of claim 5, wherein the mining the extracted metadata further comprises at least one of search result clustering or majority voting.

7. The method of claim 5, wherein the mining comprises:
applying a first key term mining technique to mine a first key term set comprising at least one key term,
applying a second key term mining technique to mine a second key term set comprising at least one key term, and
reconciling the first key term set and the second key term set into the one or more metadata items suitable for associating with the query media object as descriptors.

8. The method of claim 5, wherein the mining the extracted metadata further includes utilizing an ontology.

9. The method of claim 5, wherein either the identifying metadata or the mining includes utilizing a machine learning module comprising:
at least one learning routine,
at least one rule generated from the at least one learning routine, and
a rules engine.

10. The method of claim 1, further comprising:
receiving a query, the query comprising an identifier for the query media object; and extracting the similarity attributes of the query media object to enable the identifying.

11. The method of claim 1, further comprising:
receiving a query, the query comprising one or more key terms;
extracting one or more key terms;
retrieving the query media object based at least on the one or more key terms; and
extracting the similarity attributes of the query media object to enable the identifying.

12. The method of claim 11 wherein the extracting the one or more key terms includes utilizing a parser and a grammar.

13. The method of claim 1, wherein the method is performed during an on-line, interactive session.

14. A computer-implemented method comprising:
retrieving a first media object from a first location specified by a location specifier comprising one or more locations of media objects;
extracting first visual words from the first media object, at least one of the first visual words being a vector quantization of a visual feature extracted from a media object;
storing first visual words from the first media object;
determining that the first visual words indicate the first media object is a near-duplicate of a second media object and a third media object stored at a second location specified by the location specifier based in part on analyzing the first visual words of the first media object with respect to second visual words of the second media object and third visual words of the third media object, the second visual words and the third visual words having similarities to the first visual words greater than a predetermined threshold;
storing metadata associated with the second media object and the third media object in a datastore as a set of metadata;
increasing the set of metadata based, at least in part, on a synonym dictionary; and
in response to determining that 4 the first media object is a near-duplicate of the second media object and the third media object:
mining the set of metadata to produce consolidated metadata, wherein the mining the set of metadata includes utilizing a globalization data store, which maps terms from a first language to analogous terms in a second language;
evaluating the consolidated metadata to determine one or more key terms that are common to both the second media object and the third media object; and
associating the one or more key terms that are common to both the second media object and the third media object with the first media object.

15. The method of claim 14, wherein the location specifier is a list of fully qualified paths of multimedia files.

16. A computer system comprising a processor and memory to store computer-executable instructions that, when executed by the processor, perform operations including:
retrieving a plurality of media objects responsive to a query media object presented to a search engine;
extracting first visual words from the query media object, at least one of the first visual words being a vector quantization of a visual feature extracted from a media object;
identifying near-duplicate media objects from the plurality of media objects based at least on analyzing the first visual words with respect to a plurality of visual words corresponding to individual media objects of the plurality of media objects, the near-duplicate media objects having at least one of the plurality of visual words with similarities to the first visual words greater than a predetermined threshold;
storing metadata associated with the media objects in a datastore as a set of metadata;
increasing the set of metadata based, at least in part, on a synonym dictionary;
mining the set of metadata associated with the near-duplicate media objects to produce consolidated metadata, wherein the mining the set of metadata includes utilizing a globalization data store, which maps terms from a first language to analogous terms in a second language;
evaluating the consolidated metadata to determine one or more key terms that are common among the near-duplicate media objects, the one or more key terms previously stored in a key term data store; and
associating the one or more key terms that are common among the near-duplicate media objects with the query media object as one or more descriptors of the query media object to enable discovery of the query media object based on the descriptors.

17. The computer system of claim 16, wherein the operations further comprise storing the associations of the one or more key terms to the query media object in an associations datastore.

18. The computer system of claim 17, wherein the operations further comprise indexing the associations datastore.

19. The computer system of claim 16, wherein the operations further comprise:
receiving feedback indicating that a key term is incorrectly associated with the query media object; and
disassociating the key term that was incorrectly associated from the query media object.

* * * * *